United States Patent
Aoki et al.

(10) Patent No.: US 9,513,849 B2
(45) Date of Patent: Dec. 6, 2016

(54) INFORMATION PROCESSING APPARATUS, INFORMATION PROCESSING METHOD, AND RECORDING MEDIUM

(71) Applicants: Yosuke Aoki, Kanagawa (JP); Hitoshi Moriyama, Kanagawa (JP)

(72) Inventors: Yosuke Aoki, Kanagawa (JP); Hitoshi Moriyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/541,429

(22) Filed: Nov. 14, 2014

(65) Prior Publication Data

US 2015/0153971 A1 Jun. 4, 2015

(30) Foreign Application Priority Data

Nov. 29, 2013 (JP) .................................. 2013-248686
Mar. 17, 2014 (JP) .................................. 2014-054115

(51) Int. Cl.
*G06F 3/12* (2006.01)

(52) U.S. Cl.
CPC ........... *G06F 3/1206* (2013.01); *G06F 3/1245* (2013.01); *G06F 3/1247* (2013.01); *G06F 3/1282* (2013.01); *G06F 3/1275* (2013.01)

(58) Field of Classification Search
None
See application file for complete search history.

(56) References Cited

U.S. PATENT DOCUMENTS

| 6,874,034 B1* | 3/2005 | Hertling | G06F 3/1204 709/201 |
| 2003/0202213 A1* | 10/2003 | Saito | H04N 1/32144 358/1.18 |
| 2004/0046973 A1* | 3/2004 | Sugahara | G06K 15/00 358/1.1 |
| 2007/0127064 A1* | 6/2007 | Kuroshima | 358/1.15 |
| 2009/0279124 A1 | 11/2009 | Liu et al. | |
| 2012/0218577 A1* | 8/2012 | Dumitrescu | G06F 3/1205 358/1.13 |

(Continued)

FOREIGN PATENT DOCUMENTS

| JP | 09-179833 | 7/1997 |
| JP | 2012-238188 | 12/2012 |
| JP | 2013-088992 | 5/2013 |

OTHER PUBLICATIONS

Extended European Search Report issued Apr. 16, 2015 in Patent Application No. 14194685.5.

*Primary Examiner* — Huo Long Chen
(74) *Attorney, Agent, or Firm* — Oblon, McClelland, Maier & Neustadt, L.L.P.

(57) ABSTRACT

An information processing apparatus creates drawing data using print setting information and print data. The information processing apparatus includes: a converting module that converts the print setting information to apparatus setting information handled in the information processing apparatus; a control mode determining module that analyzes the print setting information to thereby determine a control mode applicable when the drawing data is created; a drawing data creating module that creates drawing data using the apparatus setting information and the print data; and a creating module control module that controls the drawing data creating module according to the control mode.

17 Claims, 13 Drawing Sheets

(56) References Cited

U.S. PATENT DOCUMENTS

2012/0287463 A1 11/2012 Iida
2013/0135664 A1* 5/2013 Kshitiz ............... G06F 3/1211
                                                  358/1.15

* cited by examiner

FIG.1
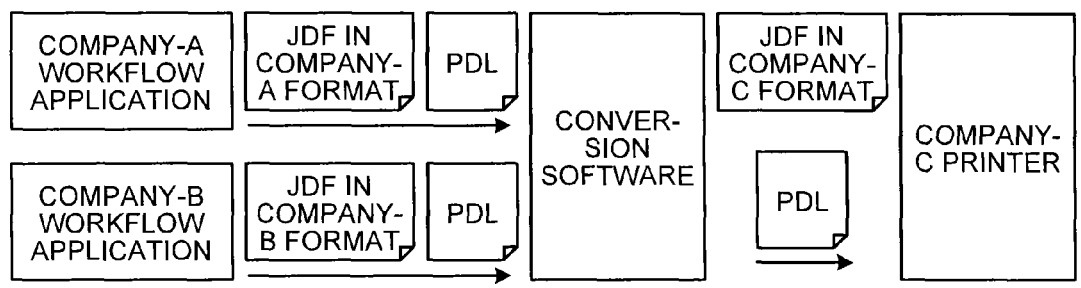
FIG.2
EXAMPLE) 4up
■COMPANY A *Page Mode*
JDF : 4up
PDL PAGE DATA: 4 PAGES
INPUT
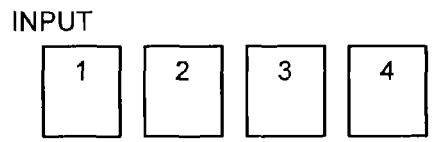
OUTPUT
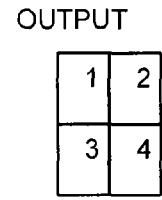
■COMPANY B *Sheet Mode*
JDF : 4up
PDL PAGE DATA: 1 PAGE
INPUT
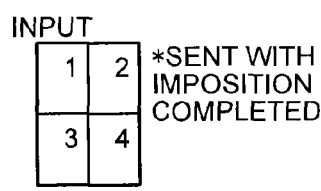 *SENT WITH IMPOSITION COMPLETED
OUTPUT
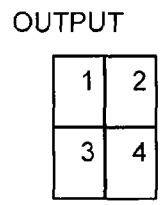

FIG.7A

```
<JDFxmlns="http://www.CIP4.org/JDFSchema_1_1" xmlns:C="www.ccc.com/schema/ccc"...>
   :
  <ResourceLinkPool>
    <ComponentLink ... Amount = "2" ...  />
    :
  </ResourceLinkPool>
  <ResourcePool>
    <LayoutPreparationParams ... Rotate = "Rotate90" ... >
    :
    </LayoutPreparationParams>
    :
  </ResourcePool>
</JDF>
```

FIG.7B

```
<JDFxmlns="http://www.CIP4.org/JDFSchema_1_1" xmlns:A="www.aaa.com/schema/aaa"...>
   :
  <ResourceLinkPool>
    <ComponentLink ... Amount = "2" ...  />
    :
  </ResourceLinkPool>
  <ResourcePool>
    <LayoutPreparationParams ... A:Rotate = "Rotate90" ... >
    :
    </LayoutPreparationParams>
    :
  </ResourcePool>
</JDF>
```

FIG.7C

```
<JDFxmlns="http://www.CIP4.org/JDFSchema_1_1" xmlns:B="www.bbb.com/schema/bbb"...>
   :
  <ResourceLinkPool>
    <ComponentLink ... B:DeliveryAmount = "2" ...  />
    :
  </ResourceLinkPool>
  <ResourcePool>
    :
    <LayoutPreparationParams ... B:AlternateRotation = "false" ... B:Rotate = "1" >
    :
    </LayoutPreparationParams>
    :
  </ResourcePool>
</JDF>
```

FIG.8A

| COMPANY-C JDF | | JOB ATTRIBUTES IN DFE | |
|---|---|---|---|
| ATTRIBUTE NAME | VALUE | ITEM NAME | ITEM VALUE |
| Amount | | NUMBER OF COPIES | |
| | 1 TO 32767 | | 1 TO 32767 COPIES |
| Rotate | | ROTATE | |
| | Rotate0 | | 0° ROTATE |
| | Rotate90 | | 90° ROTATE |
| | Rotate180 | | 180° ROTATE |
| | Rotate270 | | 270° ROTATE |
| ... | | ... | |
| | ... | | ... |
| | ... | | ... |

FIG.8B

| COMPANY-A JDF | | JOB ATTRIBUTES IN DFE | |
|---|---|---|---|
| ATTRIBUTE NAME | VALUE | ITEM NAME | ITEM VALUE |
| A: Amount | | NUMBER OF COPIES | |
| | 1 TO 32767 | | 1 TO 32767 COPIES |
| A: Rotate | | ROTATE | |
| | 1 | | 0° ROTATE |
| | 2 | | 90° ROTATE |
| | 3 | | 180° ROTATE |
| | 4 | | 270° ROTATE |
| ... | | ... | |
| | ... | | ... |
| | ... | | ... |

FIG.8C

| COMPANY-B JDF | | JOB ATTRIBUTES IN DFE | |
|---|---|---|---|
| ATTRIBUTE NAME | VALUE | ITEM NAME | ITEM VALUE |
| B: DeliveryAmount | | NUMBER OF COPIES | |
| | 1 TO 32767 | | 1 TO 32767 COPIES |
| B: AlternateRotate | | ROTATE | |
| | true | | |
| | false | | |
| B: Rotate | | | |
| | 1 | | 0° ROTATE |
| | 2 | | 90° ROTATE |
| | 3 | | 180° ROTATE |
| | 4 | | 270° ROTATE |
| ... | | ... | |
| | ... | | ... |
| | ... | | ... |

FIG.10

JOB ATTRIBUTES IN DFE

| | ITEM | |
|---|---|---|
| JOB INFORMATION | NUMBER OF COPIES | |
| | PAGE COUNT | |
| | RIP CONTROL MODE (Page Mode or Sheet Mode) | |
| EDIT INFORMATION | ORIENTATION INFORMATION | |
| | PRINT SIDE INFORMATION | |
| | ROTATE | |
| | ENLARGE/REDUCE | |
| | IMAGE POSITION | OFFSET |
| | | POSITION ADJUSTMENT INFORMATION |
| | LAYOUT INFORMATION | CUSTOM IMPOSITION PLACEMENT |
| | | PAGE COUNT |
| | | IMPOSITION INFORMATION |
| | | PAGE ORDER INFORMATION |
| | | CREEP POSITION INFORMATION |
| | MARGIN INFORMATION | |
| | CROP MARK INFORMATION | CENTER CROP MARK INFORMATION |
| | | CORNER CROP MARK INFORMATION |
| FINISHING INFORMATION | COLLATE INFORMATION | |
| | STAPLE/BIND INFORMATION | |
| | PUNCH INFORMATION | |
| | FOLD INFORMATION | |
| | TRIM INFORMATION | |
| | OUTPUT TRAY INFORMATION | |
| | INPUT TRAY INFORMATION | |
| | COVER SHEET INFORMATION | |
| RIP CONTROL MODE (Page Mode or Sheet Mode) | | |

FIG.11

RIP Parameter List

| ITEM | | |
|---|---|---|
| INPUT/OUTPUT DATA TYPE INFORMATION | | |
| INPUT/OUTPUT DATA READ/WRITE POSITION SPECIFICATION INFORMATION | | |
| INPUT/OUTPUT DATA READ/WRITE POSITION INFORMATION | | |
| INPUT/OUTPUT DATA READ/WRITE EXECUTION MODE INFORMATION | | |
| UNIT INFORMATION (DIMENSION) | | |
| INPUT/OUTPUT DATA COMPRESSION METHOD INFORMATION | | |
| RIP CONTROL MODE (Page Mode or Sheet Mode) | | |
| INPUT/ OUTPUT IMAGE INFORMATION PART | OUTPUT IMAGE-RELATED INFORMATION | IMAGE FORMAT TYPE |
| | | IMAGE FORMAT DIMENSION |
| | | IMAGE FORMAT RESOLUTION |
| | | IMAGE POSITION |
| | | COLOR SEPARATION INFORMATION |
| | | COLOR PLANE FIT POLICY INFORMATION |
| | | PLANE SHIFT INFORMATION |
| | | IMAGE FORMAT COLOR BIT COUNT |
| | | IMAGE ORIENTATION INFORMATION |
| | | IMAGE FORMING POSITION INFORMATION |
| | | IMAGE FORMING SIZE INFORMATION |
| | | IMAGE FORMING METHOD INFORMATION |
| | | COLOR ICC INFORMATION |
| | | FONT REPLACEMENT INFORMATION |
| | | IMAGE FORMING ORIGIN INFORMATION |
| | | FLAT K BLACK INFORMATION |
| | | RENDERING INFORMATION |
| | INPUT IMAGE-RELATED INFORMATION | IMAGE FORMAT TYPE |
| | | IMAGE FORMAT DIMENSION |
| | | IMAGE FORMAT RESOLUTION |
| | | IMAGE POSITION |
| | | INPUT DATA |
| | | PAGE RANGE INFORMATION |
| | | COLOR ICC INFORMATION |
| | INFORMATION RELATING TO IMAGE HANDLING | SCALING OFFSET INFORMATION |
| | | OBJECT AREA INFORMATION |
| | | HALFTONE INFORMATION |
| | | SCALING ALGORITHM INFORMATION |
| PDL-RELATED INFORMATION | DATA AREA | |
| | SIZE INFORMATION | |
| | DATA PLACEMENT METHOD | |

INFORMATION PROCESSING APPARATUS, INFORMATION PROCESSING METHOD, AND RECORDING MEDIUM

CROSS-REFERENCE TO RELATED APPLICATIONS

The present application claims priority to and incorporates by reference the entire contents of Japanese Patent Application No. 2013-248686 filed in Japan on Nov. 29, 2013 and Japanese Patent Application No. 2014-054115 filed in Japan on Mar. 17, 2014.

BACKGROUND OF THE INVENTION

1. Field of the Invention

The present invention relates generally to information processing apparatuses that prepare drawing data using print setting information and print data.

2. Description of the Related Art

What is called "production printing" is known, which prints or binds a large volume of documents for business uses (see, for example, Japanese Laid-open Patent Publication No. 2012-238188). Japanese Laid-open Patent Publication No. 2012-238188 discloses a printing system capable of notifying the user of whether or not post-press can be performed in consideration of the entire printing system.

In production printing, the printing process is very often treated as a workflow. Efforts have been made to implement an open architecture for the print workflow. Implementing the open architecture allows software (workflow applications to be described later) and printing apparatuses of different companies to describe, for example, print job settings in major printing processes using a common system of description. Job definition format (JDF) is known as a standard format that describes general processes involved in the print workflow.

Print workflow processes include preparing documents and content, specifying a printing method, printing, and post-press. These processes are performed by various types of workflow applications and printing apparatuses. The JDF enables, for example, coordination among different printing apparatuses and printing process management regardless of the manufacturers of the workflow applications or printing apparatuses.

If a workflow application produced by a software manufacturer has extended the JDF, the JDF may contain a description unique to the workflow application. If this is the case, a workflow application or a printing apparatus in a downstream process is unable to analyze the JDF properly to perform its required processing.

As a solution to this problem, the workflow application or the printing apparatus in the downstream process may need to convert the JDF created by the upstream workflow application to a format that can be handled by the workflow application in the downstream process (see, for example, Japanese Laid-open Patent Publication No. 2013-088992). Japanese Laid-open Patent Publication No. 2013-088992 discloses a printing method in which when print instruction information encoded in a JDF code is transmitted to a printer from a personal computer (PC), the printer acquires, from the received print instruction information, the application name of an application program with which the print instruction information has been generated and transmits the application name to a server; the server then transmits JDF analytical data corresponding to the application name to the printer.

FIG. 1 is a diagram schematically illustrating exemplary JDF conversion. The workflow application of company A creates JDF and a page description language (PDL) that comply with the company-A format. The workflow application of company B creates JDF and PDL that comply with the company-B format.

The conversion software has been prepared by or for company C. The conversion software of company C converts the JDF in the company A or company B format to JDF in the company C format. This conversion enables the workflow application or the printer of company C to analyze the JDF of company A or company B and to perform the downstream process.

Unfortunately, however, although the conversion software absorbs the difference in the JDF formats as illustrated in FIG. 1, company C additionally needs the conversion software. For example, the printing method disclosed in Japanese Patent Application Laid-open No. 2013-088992 requires the server.

Furthermore, some workflow applications involve different print jobs that contain both JDF and PDL.

FIG. 2 is a diagram illustrating an exemplary case involving different print jobs. The example described below pertains to 4-page aggregated printing (4-up printing). Both the JDF created by company A and the JDF created by company B describe "4up". The PDL of company A is, however, created by the "page mode" for describing a page image of one page each, and the PDL has page images for four pages. In contrast, the PDL of company B is created by the "sheet mode" for describing a page image of four imposed pages to be aggregated, and the PDL thus has a page image of one page only.

If different job formats including PDL are used as described above, the workflow application and the printer of company C in the downstream process are unable to handle the print job (JDF and PDL) and coordination in the workflow cannot be achieved, despite the difference in JDF being absorbed by the conversion software. For example, the workflow application and the printer of company C, when performing a print job in the "page mode", can process a print job prepared by company A and perform the downstream process; however, the workflow application and the printer of company C are unable to yield a printed output as expected when processing a print job prepared by company B and performing the downstream process.

In view of the foregoing problem, there is a need to provide an information processing apparatus capable of appropriately printing a print job.

SUMMARY OF THE INVENTION

It is an object of the present invention to at least partially solve the problems in the conventional technology.

According to the present invention, there is provided an information processing apparatus that creates drawing data using print setting information and print data, the information processing apparatus comprising: a converting module that converts the print setting information to apparatus setting information; a control mode determining module that analyzes the print setting information to determine a control mode applicable when the drawing data is created; a drawing data creating module that creates drawing data using the apparatus setting information and the print data; and a creating module control module that controls the drawing data creating module according to the control mode.

The present invention also provides an information processing method that creates drawing data using print setting information and print data, the information processing method comprising: converting, by a converting module, the print setting information to apparatus setting information; determining, by a control mode determining module, a control mode applicable when the drawing data is created by analyzing the print setting information; controlling, by a creating module control module, a drawing data creating module according to the control mode; and creating, by the drawing data creating module, drawing data based on the apparatus setting information and the print data.

The present invention also provides a non-transitory computer-readable recording medium that contains a computer program that causes an information processing apparatus that creates drawing data using print setting information and print data to execute: converting the print setting information to apparatus setting information; determining a control mode applicable when the drawing data is created by analyzing the print setting information; and controlling a drawing data creating module according to the control mode to cause the drawing data creating module to create drawing data based on the apparatus setting information and the print data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a diagram schematically illustrating exemplary JDF conversion;

FIG. 2 is a diagram illustrating an exemplary case involving different PDLs;

FIGS. 7A, 7B, and 7C are diagrams illustrating part of exemplary JDF descriptions;

FIGS. 8A, 8B, and 8C are diagrams illustrating exemplary conversion tables;

FIG. 10 is a diagram schematically illustrating exemplary "job attributes in DFE";

FIG. 11 is a diagram illustrating an exemplary "RIP Parameter List";

DETAILED DESCRIPTION OF THE PREFERRED EMBODIMENT

Figure 3:
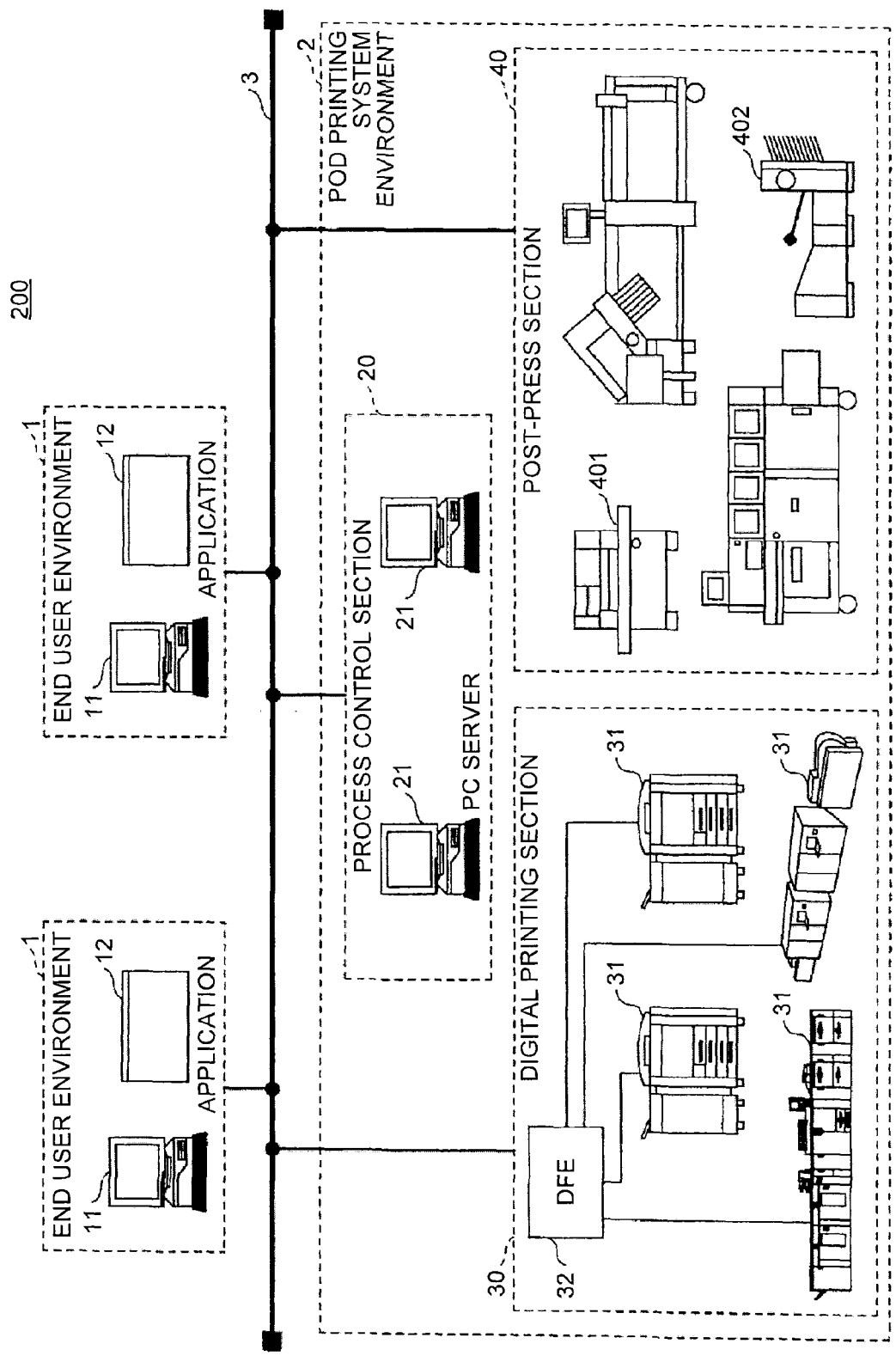
FIG. 3 is a general configuration diagram illustrating an exemplary printing system according to an embodiment of the present invention.

The following describes a preferred embodiment of the present invention with reference to the accompanying drawings. FIG. 3 is a general configuration diagram illustrating a printing system 200 according to an embodiment of the present invention. The printing system 200 in the embodiment includes at least one end user environment 1 and a print-on-demand (POD) printing system environment 2 connected to each other via a network 3 such as a LAN and the Internet.

The end user environment 1 includes a client PC 11 disposed therein. A workflow application for the POD printing work (hereinafter referred to simply as an application) 12 is installed on the client PC 11 and the client PC 11 can generate a print job based on an operation received from a user.

The application 12 can perform an aggregated printing function (N-up imposition function) for pasting a plurality of logical page images on a side of a sheet of paper and an image editing function for adding a header, a footer, a page number, and the like to the side of the sheet of paper. The application 12 can also specify, for example, punching (punching holes in sheets of paper) and stapling for later bookbinding. These instructions and settings are described in JDF. The JDF may at times be called a job ticket, a work instruction sheet, or a print instruction sheet.

The POD printing system environment 2 includes a process control section 20, a digital printing section 30, and a post-press section 40 that are connected to each other via the network 3. The process control section 20 gives instructions on operations of respective processes of the digital printing section 30 and the post-press section 40 in the POD printing system environment 2 to thereby provide centralized management of a workflow of the POD printing system environment 2.

The process control section 20 receives a print job (job definition format (JDF) and a page description language (PDL)) from the end user environment 1 and stores the received print job. The JDF is exemplary setting information in the appended claims. The PDL is exemplary print data in the claims. It is noted that the PDL, while being a language for specifying drawing details of a page image (rasterized image), here means the data described in the PDL. The PDL includes portable document format (PDF), PostScript, PCL, and RPDL.

The process control section 20 is also capable of assembling operations of respective processes as a workflow based on the print job received from the end user environment 1, efficiently scheduling the operations of the digital printing section 30, the post-press section 40, and workers, and notifying an operator of an error that may occur during automatic operation as necessary. The process control section 20 generally includes at least one PC server 21.

The process control section 20 transmits the print job to the digital printing section 30 and causes the digital printing section 30 to perform printing. The printed output is conveyed onto the post-press section 40. The post-press section 40 performs a bookbinding operation as instructed by the process control section 20. The print job may be directly transmitted from the digital printing section 30 to the post-press section 40.

The digital printing section 30 includes various types of printers (e.g., a production printer, a high-speed color inkjet printer, and a color/monochrome MFP) 31. A digital front end (DFE) 32 is disposed in the digital printing section 30. The DFE 32, also known as a printer controller, controls printing performed by a printer 31. The DFE 32 may be separate from the printer 31 as illustrated in FIG. 3 or integrated with the printer 31. The DFE 32, when having acquired a print job from the process control section 20, generates raster data (exemplary drawing data in the claims) that allows the printer 31 to form a toner image or an ink image using the JDF and the PDL. The DFE 32 then transmits the raster data to the printer 31.

The digital printing section 30 includes various types of printers 31. The digital printing section 30 may include a printer 31 that is directly connected to a finisher (a post-processing device) that performs post-processing operations (post processing) on printed recording paper, such as folding, saddle stitching, case binding, and punching.

The post-press section 40 includes post-press devices, such as a folding machine, a saddle stitch binder, a case binding machine, a cutting machine, an encloser, and a collator according to operation instructions for the printed output (a post-press job) received from the process control section 20. The post-press section 40 performs finishing operations such as folding, saddle stitching, case binding, cutting, enclosing, and collating on the printed output from the digital printing section 30. The post-press section 40 includes post-processing devices for performing post-processing operations (post processings) after digital printing, such as a stapler 401 and a punching machine 402.

An end user in the end user environment 1 uses the application 12 for POD printing work on the client PC 11 to give instructions on, for example, image editing, imposition, text insertion, and post-processing and transmits the print job to the process control section 20 in the POD printing system environment 2.

Following the JDF, the PC server 21 of the process control section 20 gives the digital printing section 30 instructions on printing and the post-press section 40 instructions on post-processings.

Hardware Configuration

In the embodiment, the process control section 20 receives the print job prepared by the end user environment 1 and transmits the print job to the DFE 32. The process control section 20 or the DFE 32 therefore has a print job conversion function of the embodiment. The end user environment 1, for example, may nonetheless have the print job conversion function. Alternatively, an information processing apparatus connected to the network 3, for example, may have the print job conversion function. The following description assumes that, in the embodiment, the DFE 32 has the print job conversion function.

Figure 4:
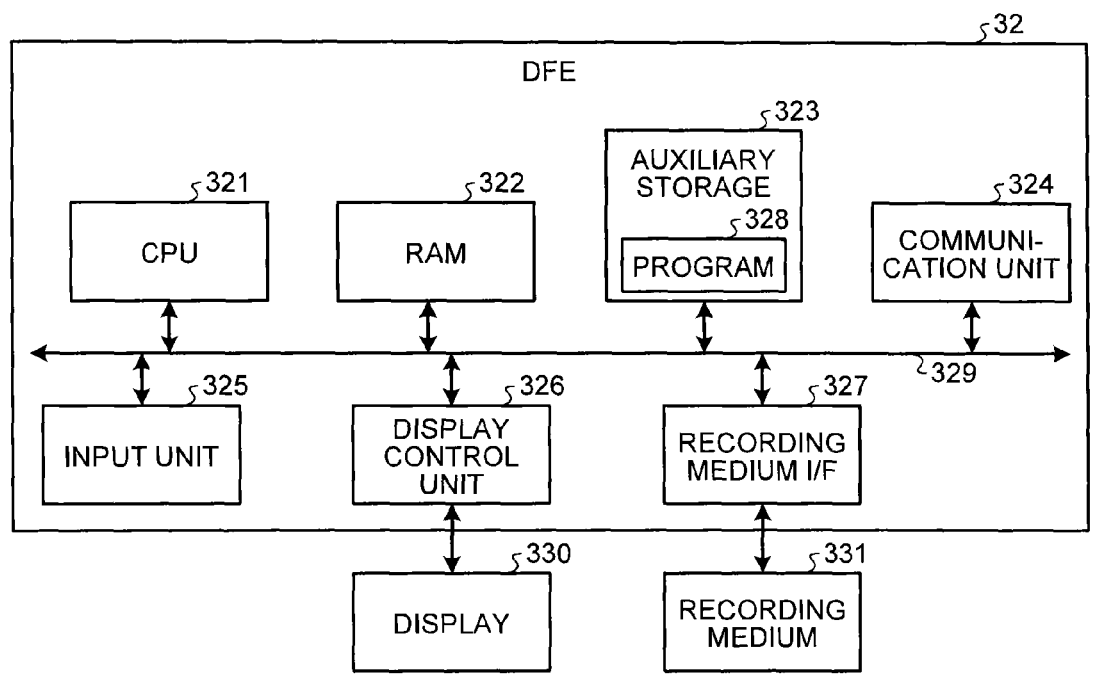
FIG. 4 is an exemplary hardware configuration diagram illustrating a DFE.

FIG. 4 is an exemplary hardware configuration diagram illustrating the DFE 32. The DFE 32 is exemplarily achieved by the hardware configuration as illustrated in FIG. 4. Specifically, the DFE 32 has functions of an information processing apparatus (a computer). The DFE 32 includes a CPU 321, a RAM 322, an auxiliary storage 323, a communication unit 324, an input unit 325, a display control unit 326, and a recording medium I/F 327, all being connected to each other by a bus 329.

The CPU 321 uses the RAM 322 as a work memory to execute a computer program, thereby controlling the entire DFE 32. The auxiliary storage 323 is a non-volatile memory such as a hard disk drive (HDD) and a solid state drive (SSD). The auxiliary storage 323 stores therein a computer program 328 that has functions of converting the print job and controlling the DFE 32.

The communication unit 324 is, for example, a modem or a LAN card and connects to the network 3 to thereby communicate with the end user environment 1, the process control section 20, or the post-press section 40. The communication unit 324 also communicates with the printer 31. The input unit 325 is, for example, a keyboard or a mouse. The input unit 325 receives an operation performed by the user and may, for example, be a keyboard or a mouse. The display control unit 326 is connected to a display 330 and, as instructed by the CPU 321, displays a screen on the display 330. The display 330 may, for example, be a touch panel.

The recording medium I/F 327 receives a portable recording medium mounted thereon. The recording medium I/F 327 writes data in and reads data from a recording medium 331 as instructed by the CPU 321. As the recording medium 331, any of various types of recording media can be used, including recording media that record information optically, electrically, or magnetically, such as a CD-ROM, an optical disc, a USB memory, and an SD card (a registered trademark), and semiconductor memories that record information electrically such as a flash memory.

The program 328 is distributed by being stored in the recording medium 331 or downloaded via the network 3 from a server not illustrated.

The hardware configuration of the client PC 11 in the end user environment 1 and the PC server 21 in the process control section 20 can be achieved by the same configuration as that illustrated in FIG. 4.

Functional Block Diagram

Figure 5:
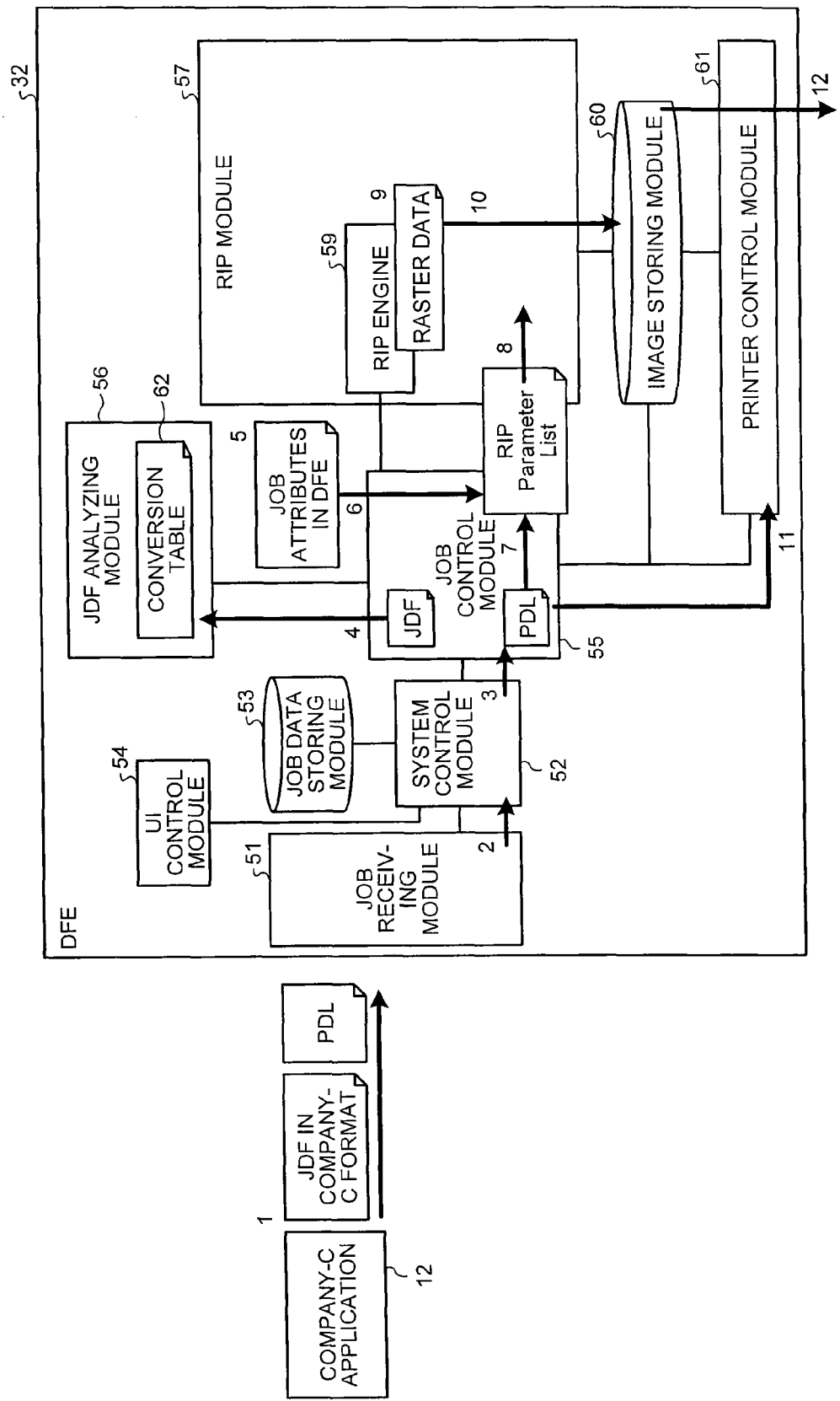
FIG. 5 is an exemplary functional block diagram illustrating a conventional DFE presented for comparison purposes.

FIG. 5 is an exemplary functional block diagram illustrating a conventional DFE 32 presented for comparison purposes. The DFE 32 performs job control, raster image processor (RIP) control, and printer control in the workflow. As such, the DFE 32 operates as a server that provides the end user environment 1 and the process control section 20 with major printing functions. It is here noted that the job control refers to a series of control operations performed for performing print job steps, including accepting a print job, analyzing the JDF, creating raster data, and printing by the printer 31. The RIP control refers to, after "job attributes in DFE" to be described later have been created, preparing a "RIP Parameter List" and causing a RIP engine 59 to create raster data. The "RIP" refers to an IC dedicated to creating raster data and the creation of (rendering) the raster data. The printer control refers to sending the raster data and part of the "job attributes in DFE" (finishing information to be described later) to the printer 31 to thereby cause the printer 31 to perform printing.

The DFE 32 is compatible with the application 12 of company C and can properly perform printing for any print job (JDF and PDL) in the company-C format. The following describes steps to complete printing.

1. A job receiving module 51 receives a print job (JDF and PDL) in the company-C format from the end user environment
2. The job receiving module 51 outputs the print job to a system control module 52.
3. The system control module 52 outputs the print job to a job control module 55 either directly or after temporarily causing a job data storing module 53 to store the print job depending on the setting.
4. The job control module 55, while transmitting the JDF in the print job to a JDF analyzing module 56, outputs a JDF conversion request to the JDF analyzing module 56.
5. The JDF analyzing module 56 converts the JDF in the company-C format to the "job attributes in DFE" that can be handled by the DFE 32. The "job attributes in DFE" will be described later. Briefly, for example, the "job attributes in DFE" are the result of each attribute of the print job being converted to a format the DFE 32 of company C can handle. The "job attributes in DFE" are exemplary device setting information in the claims.

6. The JDF analyzing module 56 outputs the converted "job attributes in DFE" to the job control module 55.
7. The job control module 55 generates a "RIP Parameter List" from the "job attributes in DFE" and the "PDL". The "RIP Parameter List" is a set of information needed for performing RIP processing with the RIP engine 59. The job control module 55 determines a command of performing the RIP processing to the RIP engine 59 in accordance with information of "RIP Parameter List". This command is referred to as a RIP command.
8. The job control module 55 initializes the RIP engine 59, determines the RIP command using the information needed for performing the RIP processing described in the "RIP Parameter List", and outputs the RIP commands to the RIP engine 59.
9. The RIP engine 59 performs a drawing process according to the RIP commands. The drawing process when performed creates raster data (bitmap data) compatible with output resolution of the printer 31.
10. After the drawing process, the RIP engine 59 stores the raster data in an image storing module 60 and sends a RIP completion notification to the job control module 55.
11. The job control module 55 transmits finishing information of the "job attributes in DFE" to a printer control module 61 and makes a print execution request.
12. In response to the print execution request from the job control module 55, the printer control module 61 confirms the image stored in the image storing module 60 and then controls the printer 31 to execute printing according to the finishing information.

As described above, the DFE 32, because of being capable of analyzing the JDF in the company-C format, can convert the JDF and the PDL to the "job attributes in DFE" for rasterization using the RIP engine 59. Unfortunately, however, the JDF analyzing module 56 is unable to analyze JDF in any format other than the company-C format. Additionally, conversion software is required for conversion of the JDF. Moreover, even with the conversion software available for ready use or mounted previously on the DFE 32, the DFE 32 is unable to handle a print job in a different format such as differences in PDL structure.

DFE in the Embodiment

Figure 6:
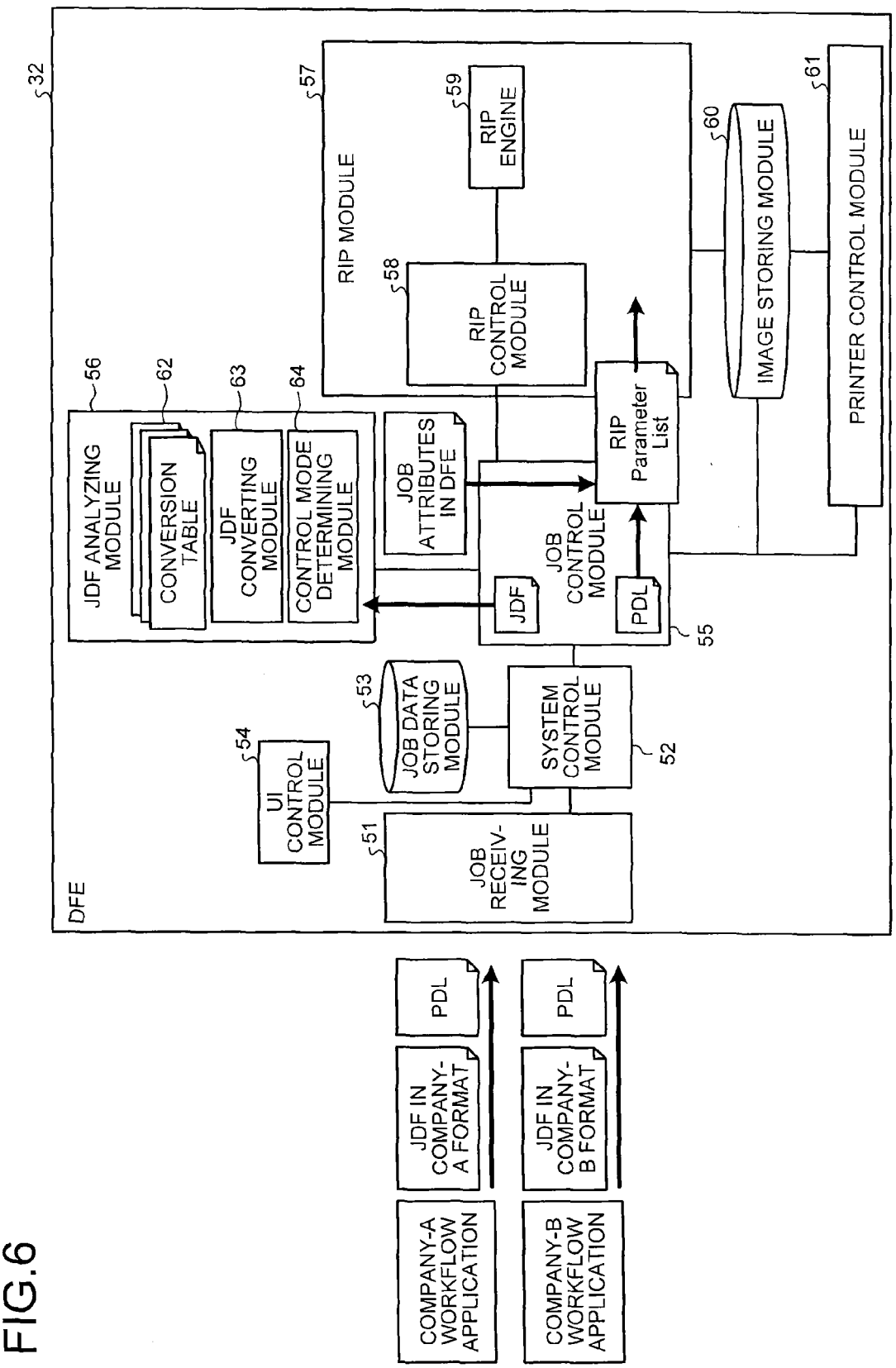
FIG. 6 is an exemplary functional block diagram illustrating the DFE in the embodiment.

FIG. 6 is an exemplary functional block diagram illustrating the DFE 32 in the embodiment. To solve the foregoing problems of the related art, the DFE 32 in the embodiment operates as follows as a major characteristic element:

A JDF converting module 63 of the JDF analyzing module 56 converts JDF in formats of various companies to the "job attributes in DFE" that can be handled by the DFE 32 of company C. A control mode determining module 64 sets a "RIP control mode" in the "job attributes in DFE".

A RIP control module 58 is newly provided in a RIP module 57. The RIP control module 58 controls the RIP engine 59 according to the "RIP control mode". Specifically, either a "page mode" or a "sheet mode" is set as the "RIP control mode". The RIP control module 58 controls the RIP engine 59 according to the "RIP control mode". Thus, the "RIP control mode" determines the applicable sequence.

"Page mode": A RIP process is specified for each page to thereby create raster data aggregated on a single sheet.
"Sheet mode": A RIP process is specified for each portion (or a cell to be described later) of a sheet onto which a plurality of pages have been aggregated to thereby create raster data.

As described above, the DFE 32 can handle the JDF in a format other than the company-C format because the JDF converting module 63 analyzes the JDF in formats of various companies. Additionally, the RIP control module 58 controls the RIP engine 59 based on the "RIP control mode". This control achieves coordination of the print workflow even with the print job containing specifications of various companies.

Reference is made to FIG. 6. The DFE 32 includes the job receiving module 51, the system control module 52, a UI control module 54, the job control module 55, the JDF analyzing module 56, the RIP module 57, the RIP control module 58, the RIP engine 59, and the printer control module 61. These elements are achieved when the CPU 321 executes the program 328 and through cooperation with various types of hardware elements including the configuration illustrated in, for example, FIG. 2. The DFE 32 further includes the job data storing module 53 and the image storing module 60 configured on, for example, the auxiliary storage 323, the RAM 322, and the recording medium 331.

The job receiving module 51 receives a print job from, for example, the application 12 via the network 3. Exemplarily, the JDF and the PDL are fetched from the received data and output to the job control module 55. Exemplarily, the job is associated with a unique job number, time and date of reception, time and date of completion, status, and the like and recorded as a log. The print job may be acquired by the job receiving module 51's reading the print job stored in a portable memory from the portable memory, instead of receiving the print job via the network 3. In the embodiment, the print job contains the JDF. If the JDF is not contained, however, the job receiving module 51 creates dummy JDF and defines print job settings required for processing the job in the DFE.

The system control module 52 stores the received print job in the job data storing module 53 or outputs the received print job to the job control module 55. If, for example, the DFE 32 specifies that the print job is temporarily stored in the job data storing module 53, the system control module 52 stores the print job in the job data storing module 53. Alternatively, exemplarily, if the JDF specifies whether or not to store the print job in the job data storing module 53, the JDF description needs to be followed.

If the user operates to display details of the print job stored in the job data storing module 53 on the display 330, for example, the system control module 52 outputs the JDF from the job data storing module 53 to the UI control module 54. If the user alters the JDF, the UI control module 54 accepts details of the alteration and the system control module 52 stores the altered JDF in the job data storing module 53 again.

The system control module 52, when having received an instruction to execute the print job from the user, the end user environment 1, or the process control section 20, outputs the print job stored in the job data storing module 53 to the job control module 55. If a print time-of-day, for example, is set in the JDF and when the print time-of-day arrives, the system control module 52 reads the print job stored in the job data storing module 53 and outputs the print job to the job control module 55.

As such, the job data storing module 53 provides a storage space for storing print jobs and is disposed in the auxiliary storage 323 of the DFE 32 or the recording medium 331. The job data storing module 53 may even be disposed in a storage (not illustrated) on the network.

The UI control module 54 interprets the JDF and displays details of the print job on the display 330. The UI control module 54 can also display the raster data created by the RIP engine 59 on the display 330.

The job control module 55 causes the RIP control module 58 to create raster data and the printer control module 61 to perform printing. Specifically, the job control module 55 transmits the JDF of the print job to the JDF analyzing module 56 and outputs a JDF conversion request to the JDF analyzing module 56.

The JDF analyzing module 56 includes the JDF converting module 63, the control mode determining module 64, and conversion tables 62. The JDF analyzing module 56 changes the JDF in the company-C format to the "job attributes in DFE" of company C as in the related art. The JDF converting module 63 analyzes descriptions of the JDF to thereby determine the software manufacturer (an exemplary creator in the claims) of the application 12 that has created the JDF. The JDF converting module 63 then uses the conversion tables 62 each created based on a correspondence between the JDF in the format of each company and the "job attributes in DFE" of company C, and modifies the JDF that varies depending on the software manufacturer of the application 12 to the "job attributes in DFE" of company C. The conversion table 62 is prepared for each software manufacturer.

FIG. 6 illustrates the JDF converting module 63 and the JDF analyzing module 56 separate from each other. It is noted that, despite the foregoing, the JDF analyzing module 56 may encompass the function of the JDF converting module 63 and the JDF analyzing module 56 thereby converts the JDF in the company-A or company-B format to the "job attributes in DFE".

The control mode determining module 64 sets the "RIP control mode" (either the "page mode" or the "sheet mode") in the "job attributes in DFE". Specifically, the control mode determining module 64 determines that the JDF is in the company-A or company-B format, and not in the company-C format (that the print job involves a different software manufacturer) and sets the "RIP control mode" suitable for the print job created by the software manufacturer of the application 12. A survey has previously been made as to whether the print job of each company is created in the "page mode" or the "sheet mode". The embodiment assumes that company C specifies the "page mode" for the aggregated print setting of the print job. The aggregated print setting is an exemplary predetermined print setting item in the claims.

The job control module 55 that has acquired the "job attributes in DFE" through the foregoing steps converts the "job attributes in DFE" and the PDL to a "RIP Parameter List" and outputs the print job in the form of the "RIP Parameter List" to the RIP control module 58. The "RIP Parameter List" is exemplary control data in the claims. The job control module 55 causes the RIP control module 58 to perform a drawing process using the RIP engine 59. Specifically, the job control module 55 needs only to prepare the "RIP Parameter List" from the "job attributes in DFE" and the PDL, just as in the configuration without the RIP control module 58. The "RIP Parameter List" includes the "RIP control mode".

The job control module 55 operates according to a sequence complying with the "page mode" at all times. The job control module 55, because of its operating in the control mode of the corresponding company at all times, does not need to be modified to be compatible with the print job (JDF and PDL) of another company. Because the job control module 55 performs a major function in executing print jobs, avoiding modifications for achieving compatibility with print jobs of other companies reduces cost and time required for development.

The RIP module 57 includes the RIP control module 58 and the RIP engine 59. The RIP module 57 creates raster data using the RIP control module 58 and the RIP engine 59.

The RIP control module 58 refers to the "RIP Parameter List" and transmits RIP commands to the RIP engine 59. The RIP control module 58 refers to the "RIP Parameter List" and, if the "RIP control mode" is the "sheet mode", outputs RIP commands to the RIP engine 59 to be compatible with the "sheet mode". This processing absorbs the difference in print jobs.

The RIP engine 59 is a rendering engine and creates the raster data through rasterization performed according to the RIP commands.

The image storing module 60 stores therein the raster data thus created. The image storing module 60 may, for example, be mounted on the auxiliary storage 323.

The printer control module 61 is connected to the printer 31 and performs printing by reading the raster data stored in the image storing module 60 and transmitting the read raster data to the printer 31. The printer control module 61 also performs a finishing process based on finishing information acquired from the job control module 55.

Another Company Information in JDF

The JDF is described in the extensible markup language (XML). The XML is a structured text standard that gives meaning to tags to thereby structure documents.

FIGS. 7A, 7B, and 7C are diagrams illustrating part of exemplary JDF descriptions. FIG. 7A illustrates descriptions that specify the print job.

JDF xmlns="http://www.CIP4.org/JDFSchema_1_1" represents a JDF ticket that complies with CIP4.

xmlns:C="www.ccc.com/schema/ccc" represents JDF tag definitions uniquely extended by each printing service provider/vendor not complying with CIP4. In the example, all tags that begin with "C:" in the JDF are extended tags.

"ResourcePool" defines a set of attributes for achieving printing.

"LayoutPreparationParams" is one of the attributes defined in "ResourcePool" and defines imposition-related attributes.

"ResourceLinkPool" defines, when attributes differ among specific ranges within a job, e.g., among pages, a set of reference to the attributes commonly used within "ResourcePool" with respect to the ranges.

"ComponentLink" is one of reference definitions within "ResourceLinkPool" and specifies reference of attributes relating to an output product and information thereof.

"Amount" specifies the number of copies.

"Rotate" specifies a rotating angle of the image.

Assume, for example, that the JDF illustrated in FIG. 7A is created by the application 12 of company C. The DFE 32 of company C can then correctly analyze the JDF. The company of the application 12 may extend the JDF as illustrated in FIGS. 7B and 7C. FIG. 7B illustrates an exemplary extension made by company A and FIG. 7C illustrates an exemplary extension made by company B.

In FIG. 7B, xmlns:A="www.aaa.com/schema/aaa" signifies that all tags that begin with "A:" in the JDF are extended tags of company A. In FIG. 7C, xmlns:B="www.bbb.com/schema/bbb" signifies that all tags that begin with "B:" in the JDF are extended tags of company B.

Thus, the JDF converting module 63 can determine the software manufacturer of the application 12 that has created the JDF by referring to these descriptions of the JDF. The JDF converting module 63 then converts the JDF to the "job attributes in DFE" that can be handled by the DFE 32 of company C using the conversion table 62 to be described later, which has been selected according to the software manufacturer of the application 12.

Creating the Job Attributes in DFE

Figure 9A:
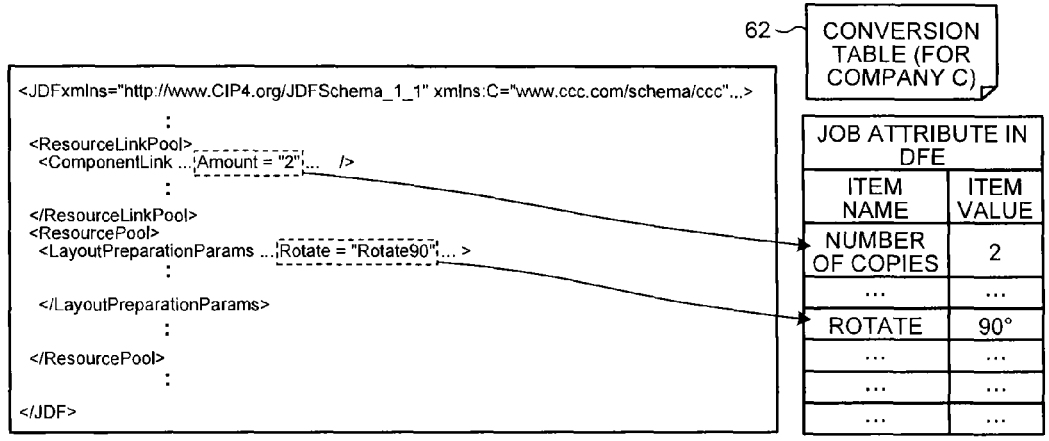
FIGS. 9A, 9B, and 9C are diagrams illustrating exemplary creation of "job attributes in DFE"
Figure 9B:
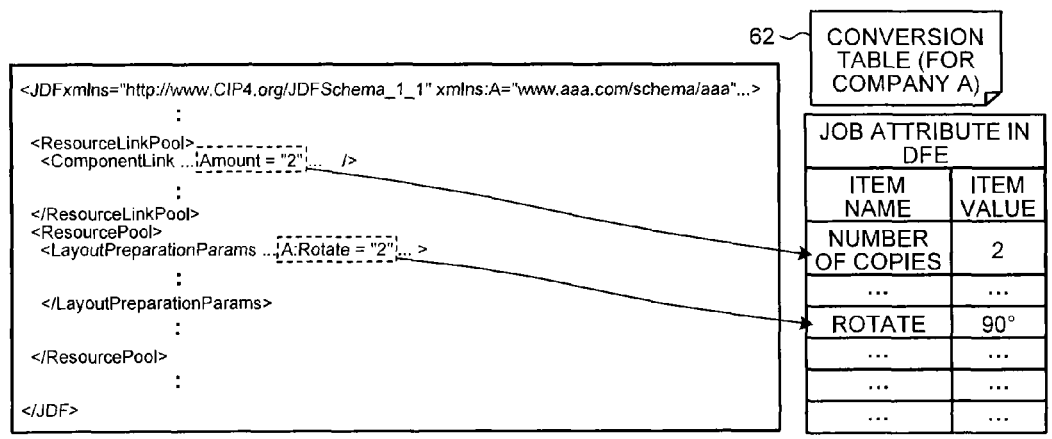
Figure 9C:
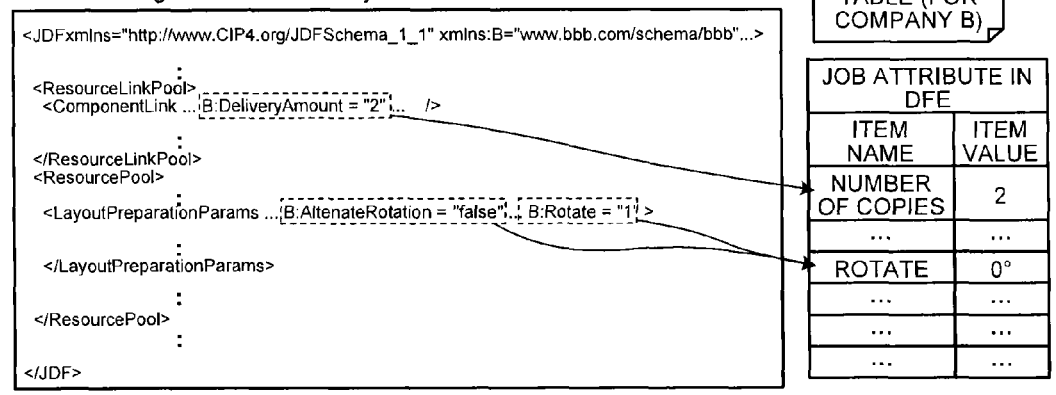

The following describes the creation of the "job attributes in DFE" with reference to FIGS. 8A to 8C and 9A to 9C. FIGS. 8A, 8B, and 8C illustrate exemplary conversion tables. FIGS. 9A, 9B, and 9C illustrate exemplary creation of the "job attributes in DFE". The JDF analyzing module 56 converts the JDF in the company-C format to the "job attributes in DFE" as in the related art. An exemplary method for the conversion is to refer to the conversion table 62 that associates tag attributes of the JDF with respective items of the "job attributes in DFE" and set an attribute value of the JDF as an item value of an item in the "job attributes in DFE".

FIG. 8A illustrates an exemplary conversion table of company C. The conversion table 62 of company C associates a value of the attribute name of "Amount" with an item value of the item name of "Number of copies" and associates a value of the attribute name of "Rotate" with an item value of the item name of "Rotate".

The JDF converting module 63, when having determined the software manufacturer that has created the print job as described above, converts the JDF to the "job attributes in DFE" using the conversion table 62 corresponding to the specific software manufacturer.

The JDF converting module 63 (or the JDF analyzing module 56) retains in advance the conversion table 62 of company A and the conversion table 62 of company B. FIG. 8B illustrates the conversion table 62 of company A and FIG. 8C illustrates the conversion table 62 of company B. The JDF converting module 63 detects, from the JDF, descriptions that specify extended tags as described above to thereby determine the manufacturer of the application 12 and uses the conversion table 62 corresponding to the specific manufacturer.

The JDF in the company-A or company-B format can be converted in the same manner as with the conversion of the JDF in the company-C format. The conversion table 62 of company A associates a value of the attribute name of "A:Amount" with an item value of the item name of "Number of copies" and associates a value of the attribute name of "A:Rotate" with an item value of the item name of "Rotate". The conversion table 62 of company B associates a value of the attribute name of "B:DeliveryAmount" with an item value of the item name of "Number of copies" and associates a value of the attribute name of "B:Rotate" with an item value of the item name of "Rotate". It is noted that, in the conversion table 62 of company B, rotation is enabled only when the value of the attribute name of "B:AlternateRotation" is "false". Thus, when the JDF is determined to be that in the company-A or company-B format, the "job attributes in DFE" can be created as with the JDF in the company-C format.

The control mode determining module 64, when determining that the format of the print job in aggregated printing has been created by the application 12 of a company different from the corresponding company (company C), sets the "sheet mode" in the item of the "RIP control mode" of the "job attributes in DFE". If the application 12 is manufactured by the corresponding company, or if the format of the print job in aggregated printing is created by the application of the same company as the corresponding company (company C), the control mode determining module 64 sets the "page mode" in the item of the "RIP control mode". This processing allows the RIP control module 58 to control RIP commands to be output to the RIP engine 59 according to the "RIP control mode".

It is noted that the "RIP control mode" may be set when the format of the print job in aggregated printing has been created by the application 12 of a company different from the corresponding company (company C) and also aggregated printing involving two or more pages is actually set in the JDF, as well as when the format of the print job in aggregated printing has been created by the application 12 of a company different from the corresponding company (company C).

FIG. 10 schematically illustrates exemplary "job attributes in DFE". The "job attributes in DFE" is broadly classified into three sections including "Job information" relating to execution of the job, "Edit information" relating to the raster data, and "Finishing information" relating to the finishing process.

"Number of copies" in the job information specifies the number of copies for the print job.

"Page count" in the job information specifies the number of pages included in the print job.

"RIP control mode" in the job information specifies the control mode in which the RIP control module 58 controls the RIP engine.

The item of "Orientation information" of the edit information specifies orientation of printing.

The item of "Print side information" of the edit information specifies the print side.

The item of "Rotate" of the edit information specifies the rotating angle of the page.

The item of "Enlarge/reduce" of the edit information specifies enlargement/reduction and zoom ratios.

The item of "Image position: offset" of the edit information specifies offset of the image.

The item of "Image position: position adjustment information" of the edit information specifies position adjustments of the image.

The item of "Layout information: custom imposition placement" of the edit information specifies placement of the custom side.

The item of "Layout information: number of pages" of the edit information specifies the number of pages on a single sheet of paper.

The item of "Layout information: imposition information" of the edit information specifies information on placement of sides.

The item of "Layout information: page order information" of the edit information specifies information on the order in which pages are printed.

The item of "Layout information: creep position adjustment" of the edit information specifies information on the adjustment of creep position.

The item of "Margin information" of the edit information specifies information on margins such as fit boxes and gutters.

The item of "Crop mark information: center crop mark information" of the edit information specifies information on center crop marks.

The item of "Crop mark information: corner crop mark information" of the edit information specifies information on corner crop marks.

The item of "Collate information" of the finishing information specifies information on whether to perform printing by the page or the document when a document is printed in a plurality of copies.

The item of "Staple/bind information" of the finishing information specifies information on stapling and binding.

The item of "Punch information" of the finishing information specifies information on punching.

The item of "Fold information" of the finishing information specifies information on folding.

The item of "Trim" of the finishing information specifies information on trimming.

The item of "Output tray information" of the finishing information specifies information on the output tray.

The item of "Input tray" of the finishing information specifies information on the input tray.

The item of "Cover sheet information" of the finishing information specifies information on the cover sheet.

Either the "page mode" or the "sheet mode" is set in the "RIP control mode" of the "job attributes in DFE".

While FIG. 10 illustrates that the "RIP control mode" is set as one of the items of the "job attributes in DFE", the "RIP control mode" may be set as being attached to the "job attributes in DFE".

RIP Parameter List

The "RIP Parameter List" is created from the "job attributes in DFE" and the PDL. As described earlier, the "job attributes in DFE" is a type of information that can be handled by the DFE 32 of company C. Specifically, the "job attributes in DFE" is described in the language system and the format the job control module 55 can analyze to create a "RIP Parameter List". The "RIP Parameter List" includes the item of the "RIP control mode"; however, the "RIP control mode" constitutes only one of the items of the "job attributes in DFE" and thus needs only to be posted in the "RIP Parameter List" from the "job attributes in DFE" as with the other items. Specifically, the "RIP Parameter List" remains the same regardless of whether the "RIP control mode" is set. Thus, when compared with the related-art job control module 55 illustrated in FIG. 5, there is no change or at least only little change in the functions of the job control module 55.

FIG. 11 illustrates an exemplary "RIP Parameter List".

"Input/output data type information" specifies the type of input/output data (the types of input/output data include not only the PDL, but also the text file and image data such as JPEG).

"Input/output data read/write position specification information" specifies the method of specifying offset (read/write position) of the input/output data. Exemplary types of specification include: from a designated position, from the current position, and from the tail end.

"Input/output data read/write position information" specifies the current processing position of the input/output data.

"Input/output data read/write execution mode information" specifies the execution mode. Examples of specification include READ, WRITE, and READ_WRITE.

"Unit information (dimension)" specifies the unit applied to the "RIP Parameter List". Examples of specification include "mm", "inch", "pel", and "point".

"Input/output data compression method information" specifies the compression method applied to the input/output data. Examples of specification include "UNCOMPRESSED" and "PACKBITS".

"RIP control mode" specifies the control mode in aggregated printing. Examples of specification include the "page mode" and the "sheet mode".

"Input/output image information part" includes "output image-related information", "input image-related information", and "information relating to image handling".

"Image format type" specifies the type of the output image format. Examples of specification include raster.

"Image format dimension" specifies the dimension of the output image format.

"Image format resolution" specifies the resolution of the output image format.

"Image position" specifies the position of the output image.

"Color separation information" specifies color separation. Examples of specification include "k", "cmyk", and "separation".

"Color plane fit policy information" specifies the policy employed to fit the color plane.

"Plane shift information" specifies the shift amount of the color plane.

"Image format color bit count" specifies the number of color bits of the output image format.

"Image orientation information" specifies the orientation of the output image page.

"Image forming position information" specifies position information for the crop area.

"Image forming size information" specifies size information for the crop area.

"Image forming method information" specifies the clip policy.

"Color ICC information" specifies information on the color ICC profile.

"Font replacement information" specifies information on replacement of fonts.

"Image forming origin information" specifies the starting point for image formation. Examples of specification include "center" and "upper right".

"Flat K black information" specifies information on the flat K black.

"Rendering information" specifies information on rendering (rasterizing).

"Image format type" specifies the type of the input image format. Examples of specification include raster.

"Image format dimension" specifies the dimension of the input image format.

"Image format resolution" specifies the resolution of the input image format.

"Image position" specifies the position of the input image.

"Input data" specifies the input data.

"Page range information" specifies page numbers.

"Color ICC information" specifies information on the color ICC profile.

"Scaling offset information" specifies offset of the enlargement/reduction algorithm. Examples of specification include horizontal offset and vertical offset.

"Object area information" specifies the width and the height of the object area.

"Halftone information" specifies offset of halftone. Examples of specification include horizontal offset and vertical offset.

"Scaling algorithm information" specifies the scaling method.

"PDL-related information" specifies data area, size information, and data placement method.

"Data area" specifies information on the area in which the PDL is stored. Font information, the number of pages, and other types of data are included in the PDL resident in this data area.

"Size information" specifies the size of the PDL.

"Data placement method" specifies the method for placing data. Examples of specification include little endian and big endian.

It is noted that the "RIP control mode" may be set in any other location within the "RIP Parameter List", instead of the location illustrated in FIG. 11. The "RIP control mode" may not necessarily be so entitled, as long as the "RIP control mode" is included as part of information.

Control Procedure

Figure 12:
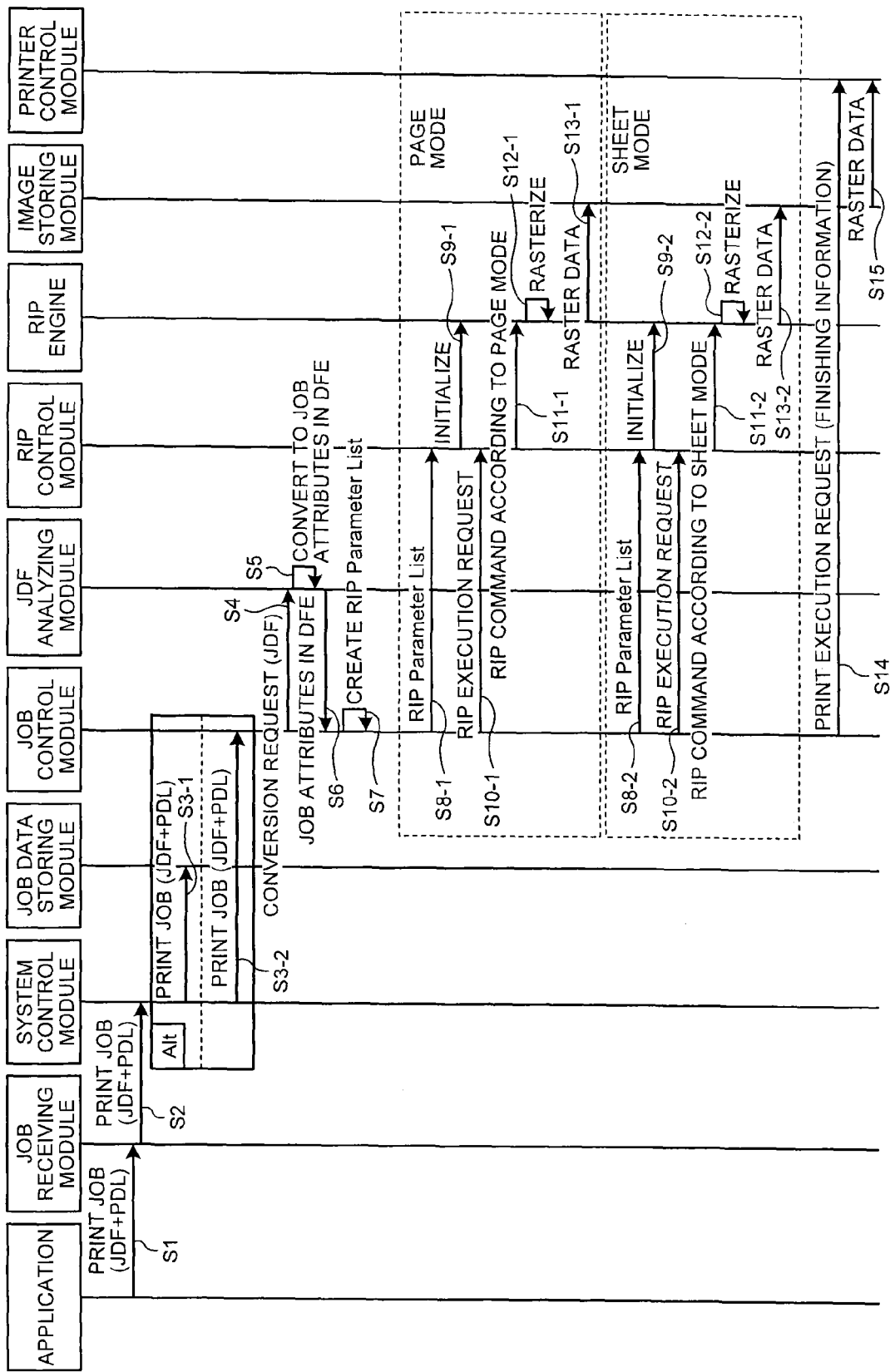
FIG. 12 is an exemplary sequence diagram illustrating operating steps of the DFE.

FIG. 12 is an exemplary sequence diagram illustrating operating steps of the DFE 32.

S1: The application 12 transmits a print job (JDF+PDL) to the job receiving module 51.

S2: The job receiving module 51 outputs the print job to the system control module 52.

Either step S3-1 or S3-2 is performed.

S3-1: If the DFE 32 is set so that the print job is stored in the job data storing module 53 or the JDF includes a setting that causes the print job to be stored in the job data storing module 53, the system control module 52 stores the print job in the job data storing module 53.

S3-2: If the print job is not set to be stored in the job data storing module 53, the system control module 52 outputs the print job to the job control module 55.

S4: The job control module 55, while outputting the JDF in the print job to the JDF analyzing module 56, outputs a JDF conversion request to the JDF analyzing module 56.

S5: The JDF analyzing module 56 converts the JDF in the formats of various companies to the "job attributes in DFE" to be processed by the DFE 32 of company C. During the conversion, the control mode determining module 64 sets the "RIP control mode" (either the "page mode" or the "sheet mode") in the "job attributes in DFE". The "RIP control mode" may be set before, during, or after the creation of the "job attributes in DFE".

S6: The JDF analyzing module 56 outputs the "job attributes in DFE" to the job control module 55.

S7: The job control module 55 creates a "RIP Parameter List" from the "job attributes in DFE" and the "PDL".

The following process varies depending on whether the "RIP control mode" is the "page mode" or the "sheet mode". The "page mode" will first be described.

S8-1: The job control module 55 outputs the "RIP Parameter List" to the RIP control module 58.

S9-1: The RIP control module 58 initializes the RIP engine 59.

S10-1: The job control module 55 makes a RIP execution request to the RIP control module 58.

S11-1: The RIP control module 58 outputs the RIP command in place of the job control module 55. When "RIP control mode" is "page mode", the RIP control module 58 outputs a RIP command with a sequence suitable for "page mode". This sequence will be described later with reference to FIG. 13.

S12-1: The RIP engine 59 performs rasterizing.

S13-1: The RIP engine 59 stores the raster data in the image storing module 60.

The following describes the "sheet mode".

S8-2: The job control module 55 outputs the "RIP Parameter List" to the RIP control module 58.

S9-2: The RIP control module 58 initializes the RIP engine 59.

S10-2: The job control module 55 makes a RIP execution request to the RIP control module 58.

S11-2: The RIP control module 58 outputs the RIP command in place of the job control module 55. If the "RIP control mode" is the "sheet mode", the RIP control module 58 outputs a RIP command in a sequence suitable for the "sheet mode". This sequence will be described later with reference to FIG. 14.

S12-2: The RIP engine 59 performs rasterizing.

S13-2: The RIP engine 59 stores the raster data in the image storing module 60.

Thus, the job control module 55 operates in the same manner whether in the "page mode" or the "sheet mode" (operates according to the "page mode" at all times) and the RIP control module 58 determines the difference between the "page mode" and the "sheet mode" based on the "RIP control mode" to thereby absorb the difference between the "page mode" and the "sheet mode".

S14: The job control module 55 outputs finishing information together with a print execution request to the printer control module 61. The timing at which the job control module 55 outputs the finishing information and the print execution request may be before or after the creation of the raster data.

S15: The printer control module 61 having acquired the print execution request confirms the raster data in the image storing module 60 and performs printing.

Figure 13:
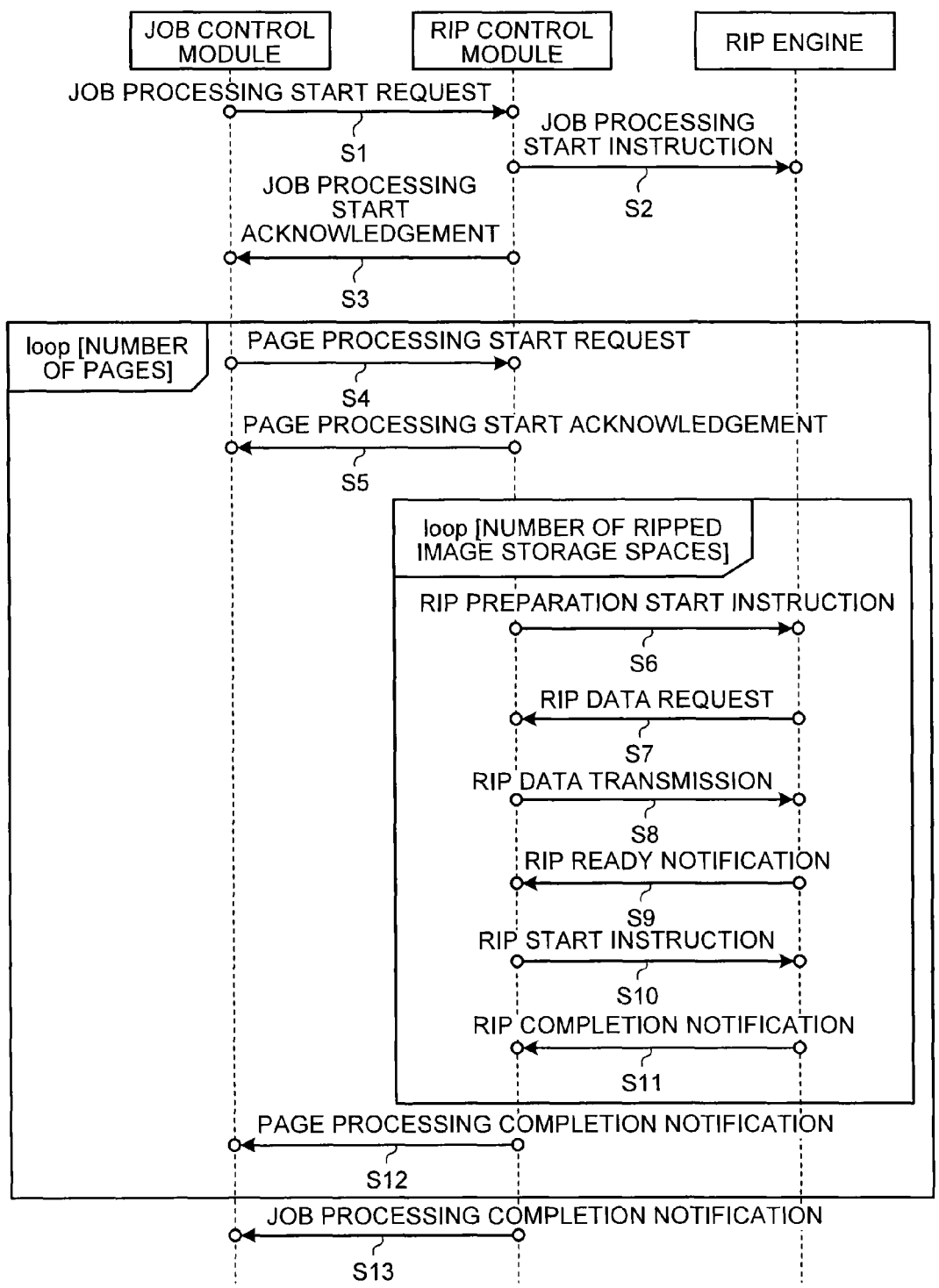
FIG. 13 is an exemplary flowchart illustrating more detailed operating steps of a raster image processor (RIP) control module in a "page mode"

FIG. 13 is an exemplary flowchart illustrating more detailed operating steps performed by the RIP control module 58 and associated parts in the "page mode". Steps performed in this flowchart replace steps from S10-1 to S12-1 illustrated in FIG. 12.

S1: The job control module 55 outputs a job processing start request to the RIP control module 58.

S2: The RIP control module 58 outputs a job processing start instruction to the RIP engine 59.

S3: The RIP control module 58 outputs a job processing start acknowledgment to the job control module 55.

Steps from S4 to S12 are repeatedly performed for the number of pages, each of which contains a predetermined number of pages aggregated thereon.

S4: The job control module 55 outputs a page processing start request to the RIP control module 58.

S5: The RIP control module 58 outputs a page processing start acknowledgment to the job control module 55.

Steps from S6 to S11 are repeatedly performed for the number of raster image processed (RIPped) image storage spaces. The "RIPped image storage space" as used herein refers to a space made available in the image storing module 60 for storing the RIPped images. If the space is sufficient for storing an image for one page, the number of times the steps are repeatedly performed is once. If the RIPped image storage space is, for example, only M-size and the image for one page has a size of 5×M, however, the steps are repeatedly performed five times (=5×M/M).

S6: The RIP control module 58 outputs a RIP preparation start instruction to the RIP engine 59.

S7: The RIP engine 59 outputs a RIP data request to the RIP control module 58 in consideration of the size of the RIPped image storage space.

S8: The RIP control module 58 transmits RIP data to the RIP engine 59.

S9: The RIP engine 59 outputs a RIP ready notification to the RIP control module 58.

S10: The RIP control module 58 outputs a RIP start instruction to the RIP engine 59.

S11: The RIP engine 59 outputs a RIP completion notification to the RIP control module 58.

S12: The RIP control module 58 outputs a page processing completion notification to the job control module 55.

S13: The RIP control module 58 outputs a job processing completion notification to the job control module 55.

Figure 14:
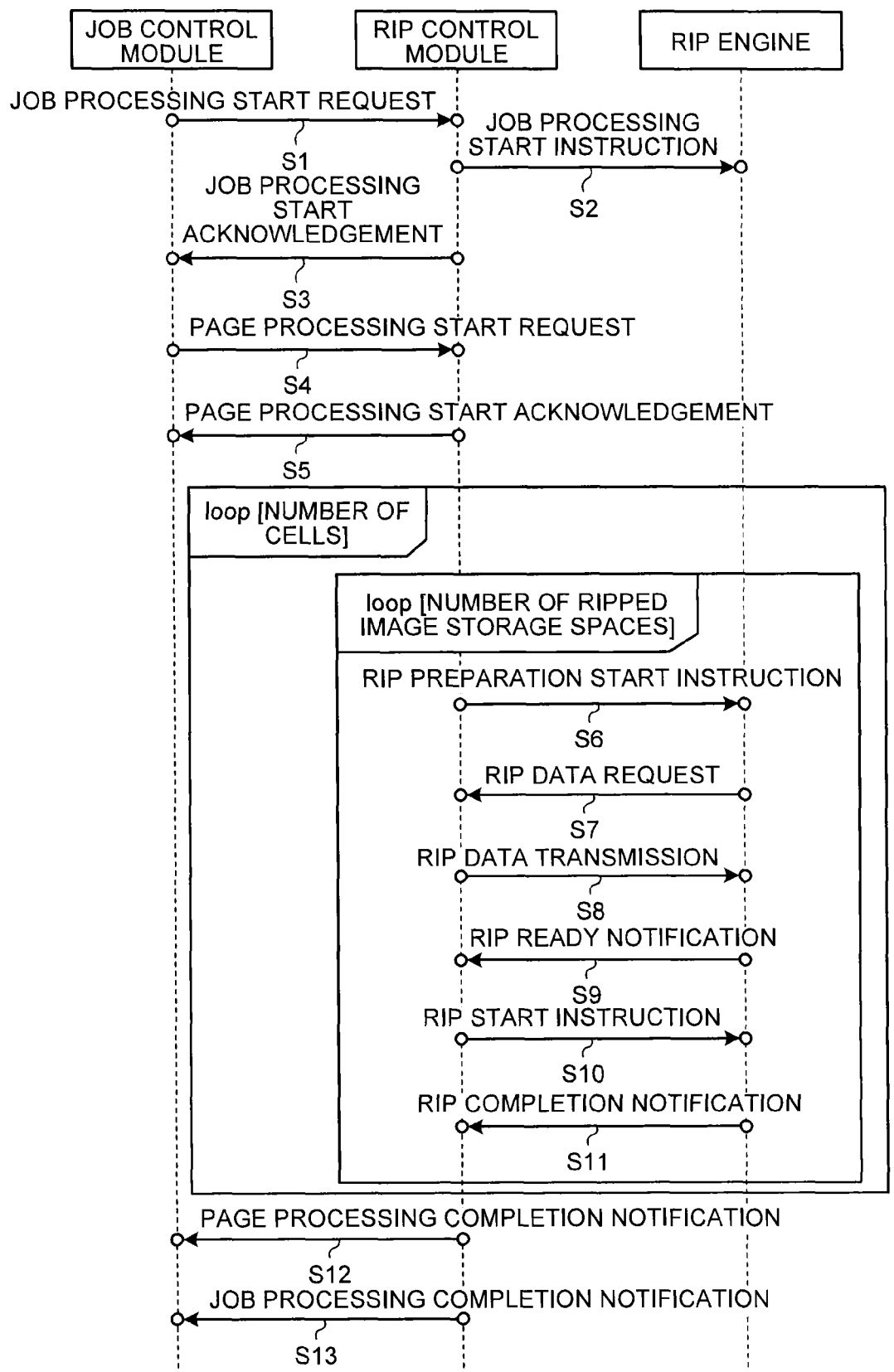
FIG. 14 is an exemplary flowchart illustrating more detailed operating steps of a RIP control module in a "sheet mode".

FIG. 14 is an exemplary flowchart illustrating more detailed operating steps performed by the RIP control module 58 and associated parts in the "sheet mode". Steps performed in this flowchart replace steps from S10-2 to S12-2 illustrated in FIG. 12.

S1: The job control module 55 outputs a job processing start request to the RIP control module 58.

S2: The RIP control module 58 outputs a job processing start instruction to the RIP engine 59.

S3: The RIP control module 58 outputs a job processing start acknowledgment to the job control module 55.

S4: The job control module 55 outputs a page processing start request to the RIP control module 58.

S5: The RIP control module 58 outputs a page processing start acknowledgment to the job control module 55.

Steps from S6 to S11 are repeatedly performed for each cell for the number of RIPped image storage spaces. The "cell" as used herein refers to an area assigned for each of the pages aggregated on one page. The cell is an exemplary image area unit in the claims.

S6: The RIP control module 58 outputs a RIP preparation start instruction to the RIP engine 59.

S7: The RIP engine 59 outputs a RIP data request to the RIP control module 58 in consideration of the size of the RIPped image storage space.

S8: The RIP control module 58 transmits RIP data to the RIP engine 59.

S9: The RIP engine 59 outputs a RIP ready notification to the RIP control module 58.

S10: The RIP control module 58 outputs a RIP start instruction to the RIP engine 59.

S11: The RIP engine 59 outputs a RIP completion notification to the RIP control module 58.

S12: The RIP control module 58 outputs a page processing completion notification to the job control module 55.

S13: The RIP control module 58 outputs a job processing completion notification to the job control module 55.

As described above, in the "page mode", the RIP control module 58 repeatedly controls the RIP engine 59 for each page and, in the "sheet mode", the RIP control module 58 repeatedly controls the RIP engine 59 for each cell. Thus, even when the format of a print job differs from that of company C, the RIP control module changes the sequence as necessary according to the "RIP control mode". The DFE 32 can thereby coordinate with the upstream process even with a different job format of the upstream process in the print workflow.

As in the embodiment, the difference in print jobs are accommodated in the "job attributes in DFE" and the "RIP Parameter List" and the RIP control module 58 changes the sequence as necessary. These arrangements can eliminate or minimize changes to be made in the job control module 55.

While the best mode for carrying out the invention has been described with reference to a specific embodiment, it should be understood that the present invention is not limited to the above-described embodiment and may include various modifications or changes without departing from the scope of the present invention.

For example, the client PC 11 of the end user environment 1 executes the application in the upstream process of the DFE 32 of company C and the JDF converting module 63 determines the software manufacturer of the application. A printing apparatus may nonetheless exist in the upstream process of the DFE 32 of company C and execute the application.

While the JDF is converted within the framework of the print workflow in the embodiment, print settings not called the JDF may be converted.

While the software manufacturer of the application 12 is determined in the embodiment, the software manufacturer may indicate the manufacturer of the printing apparatus. The software manufacturer includes not only a first company that develops the application 12, but also a second company that receives a subcontract to develop the application 12 from the first company.

The present invention can provide an information processing apparatus capable of appropriately printing a print job.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus that creates drawing data using print setting information and print data, the information processing apparatus comprising:
    digital front end configured to:
    convert the print setting information to apparatus setting information;
    analyze the print setting information to determine a control mode applicable when the drawing data is created;
    set the control mode according to operation control information including at least a Raster image processor (RIP) parameter list, wherein the RIP parameter list has at least a RIP control mode including at least a page mode and a sheet mode, (i) the page mode specifying to creak raster data aggregated on a single sheet for each page, and (ii) the sheet mode specifying for each portion of a single sheet onto which a plurality of pages aggregated to create raster data; and
    control a creation of drawing data using the apparatus setting information and the print data according to the set control mode.

2. The information processing apparatus according to claim 1, wherein the digital front end analyzes the print setting information to determine a creator that creaks the print setting in and the print data and determines the control mode according to the creator.

3. The information processing apparatus according to claim 2, wherein,
    when the creator of the print setting information and the print data describes a predetermined print setting item in a predetermined format, the digital front end sets a first control mode for the control mode, and
    when the creator of the print setting information and the print data does not describe the predetermined print setting item in the predetermined format, the digital front end sets a second control mode for the control mode.

4. The information processing apparatus according to claim 3, wherein the predetermined print setting item is an aggregated print setting.

5. The information processing apparatus according to claim 4, wherein
    when the control mode is the first control mode, the digital front end creates drawing data in units of an image area assigned for a plurality of pages integrally disposed on a page, and
    when the control mode is the second control mode, the digital front end creates drawing data in units of pages to be aggregated on a sheet of paper.

6. The information processing apparatus according to claim 3, wherein the digital front end is further configured to:
   create control data from the apparatus setting information and the print data, the control data for enabling the digital front end circuitry to control the creation of drawing data wherein
   the control mode is included in, or attached to, the apparatus setting information, and
   the digital front end create the control data in an identical format regardless of whether the control mode is the first control mode or the second control mode.

7. The information processing apparatus according to claim 6, wherein the digital front end generates the control data according to the second control mode regardless of whether the control mode is the first control mode or the second control mode.

8. The information processing apparatus according to claim 6, wherein the digital front end generates the control data in a different mode depending on whether the control mode is the first control mode or the second control mode.

9. The information processing apparatus according to claim 1, wherein
   the digital front end includes coversion tables for different creators of the print setting information and the print data, each conversion table being created based on a correspondence between items of the print setting information and items of the apparatus setting information, and
   the digital front end changes over the conversion table based on the creator detected from descriptions of the print setting information and creates the apparatus setting information.

10. The information processing apparatus according to claim 9, wherein,
    when the creator of the print setting information and the print data describes a predetermined print setting item in a predetermined format, the digital front end sets a first control mode for the control mode, and
    when the creator of the print setting information and the print data does not describe the predetermined print setting item in the predetermined format, the digital front end circuitry sets a second control mode for the control mode.

11. The information processing apparatus according to claim 10, wherein the predetermined print setting item is an aggregated print setting.

12. The information processing apparatus according to claim 11, wherein
    when the control mode is the first control mode, the digital front end creates drawing data in units of an image area assigned for a plurality of pages integrally disposed on a page, and
    when the control mode is the second control mode, the digital front end creates drawing data in units of pages to be aggregated on a sheet of paper.

13. The information processing apparatus according to claim 10, wherein the digital front end is further configured to:
   create control data from the apparatus setting information and the print data, the control data for enabling the digital Front end to control the digital front end wherein
   the control mode is included in, or attached to, the apparatus setting information, and
   the digital front end create the control data in an identical format regardless of whether the control mode is the first control mode or the second control mode.

14. The information processing apparatus according to claim 13, wherein the digital front end generates the control data in a different mode depending on whether the control mode is the first control mode or the second control mode.

15. The information processing apparatus according to claim 13, wherein the digital front end generates the control data according to the second control mode regardless of whether the control mode is the first control mode or the second control mode.

16. An information processing method that creates drawing data using print setting information and print data, the information processing method comprising:
    converting, by digital front end, the print setting information to apparatus setting information;
    determining, by the digital front end, a control mode applicable when the drawing data is created by analyzing the print setting information;
    setting, by the digital front end, the control mode according to operation control information including at least a Raster Image Processor (RIP) parameter list, wherein the RIP parameter list has at least a RIP control mode including at least a page mode and a sheet mode, (i) the page mode specifying to create raster data aggregated on a single sheet for each page, and (ii) the sheet mode specifying for each portion of a single sheet onto which a plurality or pages aggregated to create raster data; and
    controlling, by the digital front end, a creation of drawing data using the apparatus setting information and the print data according to the set control mode.

17. A non-transitory computer-readable recording medium that contains a computer program that causes an information processing apparatus that creates drawing data using print setting information and print data to execute:
    converting the print setting information to apparatus setting information;
    determining a control mode applicable when the drawing data is created by analyzing the print setting information;
    setting the control mode according to operation control information including at least a Raster Image Processor (RIP) parameter list, wherein the RIP parameter list has at least a RIP control mode including at least a page mode and a sheet mode, (i) the page mode specifying to create raster data aggregated on a single sheet for each page, and (ii) the sheet mode specifying for each portion of a single sheet onto which a plurality of pages aggregated to create raster data; and
    generating the apparatus setting information and the print data to control a creation of drawing data according to the set control mode.

* * * * *